US007907843B2

United States Patent
Yamaji et al.

(10) Patent No.: US 7,907,843 B2
(45) Date of Patent: Mar. 15, 2011

(54) TECHNIQUE OF IDENTIFYING A DEFECTIVE SUBSCRIBER DEVICE IN A POINT-TO-MULTIPOINT NETWORK WITHOUT STOPPING NORMAL SUBSCRIBER DEVICES

(75) Inventors: Katsuichi Yamaji, Fukuoka (JP); Toshimi Kida, Fukuoka (JP); Toshihiro Noguchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 728 days.

(21) Appl. No.: 11/905,106

(22) Filed: Sep. 27, 2007

(65) Prior Publication Data

US 2008/0095532 A1    Apr. 24, 2008

(30) Foreign Application Priority Data

Oct. 19, 2006    (JP) ................. 2006-285544

(51) Int. Cl.
*H04B 10/08* (2006.01)
*H04J 14/08* (2006.01)
(52) U.S. Cl. ............... 398/22; 398/17; 398/98; 398/100
(58) Field of Classification Search ............. 398/9–38, 398/98, 99, 100
See application file for complete search history.

(56) References Cited

U.S. PATENT DOCUMENTS

| 2006/0268759 A1* | 11/2006 | Emery et al. ............ 370/321 |
| 2007/0201867 A1* | 8/2007 | DeLew et al. ............ 398/38 |

FOREIGN PATENT DOCUMENTS

JP    2002-359596    12/2002

* cited by examiner

*Primary Examiner* — Ken N Vanderpuye
*Assistant Examiner* — Daniel G Dobson
(74) *Attorney, Agent, or Firm* — Fujitsu Patent Center

(57) ABSTRACT

In a point-to-multipoint network of an optical line terminal (OLT) and multiple optical network units (ONUS) wherein each ONU is enabled to send a signal only within a time period enabled for the ONU, the OLT (or a system installed therein) identifies a defective one of the ONUs. For each of a given series of time periods, the OLT measures an optical reception level of an optical fiber signal in the time period. The OLT stores, in advance, in a table at least the reception level of a received signal from each ONU in association with the ONU. The reception level is measured in a normal state where signals from the ONUs are exclusively received. For each of the given series of time periods, the OLT decides whether a signal from one of the ONUs associated with the time period is exclusively received with no collision with any other signal. If the signal from an ONU associated with the time period is not exclusively received, the OLT identifies the defective ONU based on a measured optical reception level for the time period, a stored reception level of an ONU stored in the table and associated with the time period and the table.

13 Claims, 12 Drawing Sheets

FIG.1A

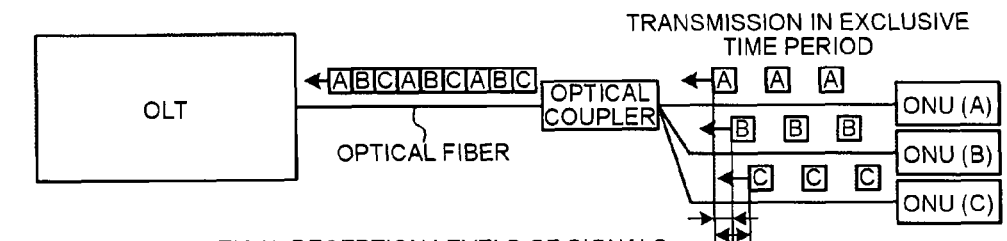

(1) MEASURE OPTICAL RECEPTION LEVELS OF SIGNALS WHEN SIGNALS CAN BE EXCLUSIVELY RECEIVED

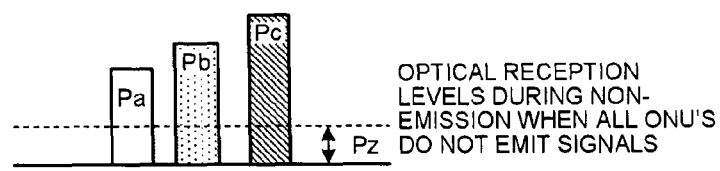

OPTICAL RECEPTION LEVELS DURING NON-EMISSION WHEN ALL ONU'S DO NOT EMIT SIGNALS (2) STORE VALUES OBTAINED BY SUBTRACTING OPTICAL RECEPTION LEVELS Pz DURING NON-EMISSION FOR RESPECTIVE ONU'S

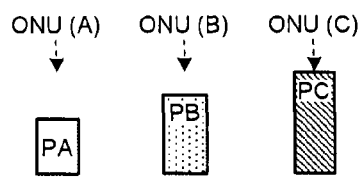

FIG.1B

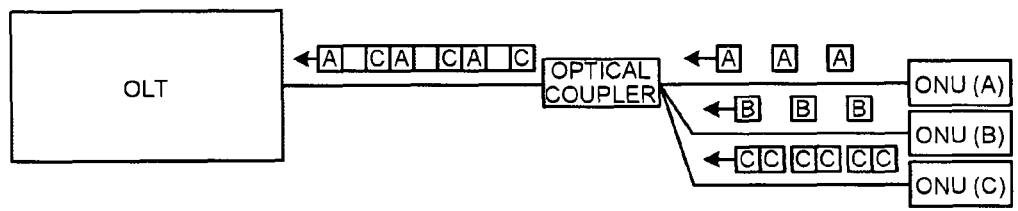

(1) MEASURE OPTICAL RECEPTION LEVELS OF SIGNALS UPON DETERMINING THAT SIGNALS TRANSMITTED DURING PREDETERMINED TIME PERIOD CANNOT BE EXCLUSIVELY RECEIVED

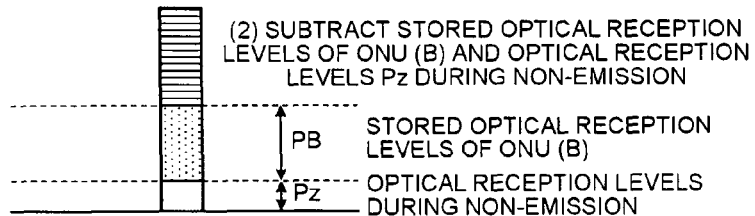

(2) SUBTRACT STORED OPTICAL RECEPTION LEVELS OF ONU (B) AND OPTICAL RECEPTION LEVELS Pz DURING NON-EMISSION

PB STORED OPTICAL RECEPTION LEVELS OF ONU (B)

Pz OPTICAL RECEPTION LEVELS DURING NON-EMISSION (3) COMPARE CALCULATED VALUES WITH STORED VALUES OF RESPECTIVE ONU'S

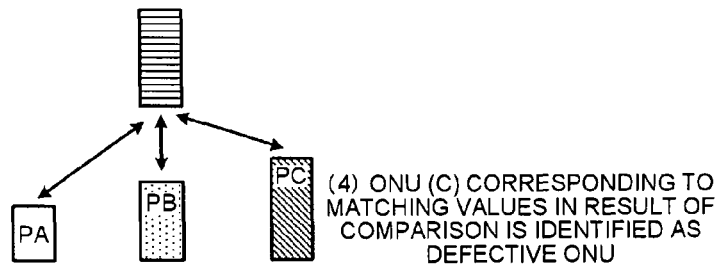

(4) ONU (C) CORRESPONDING TO MATCHING VALUES IN RESULT OF COMPARISON IS IDENTIFIED AS DEFECTIVE ONU

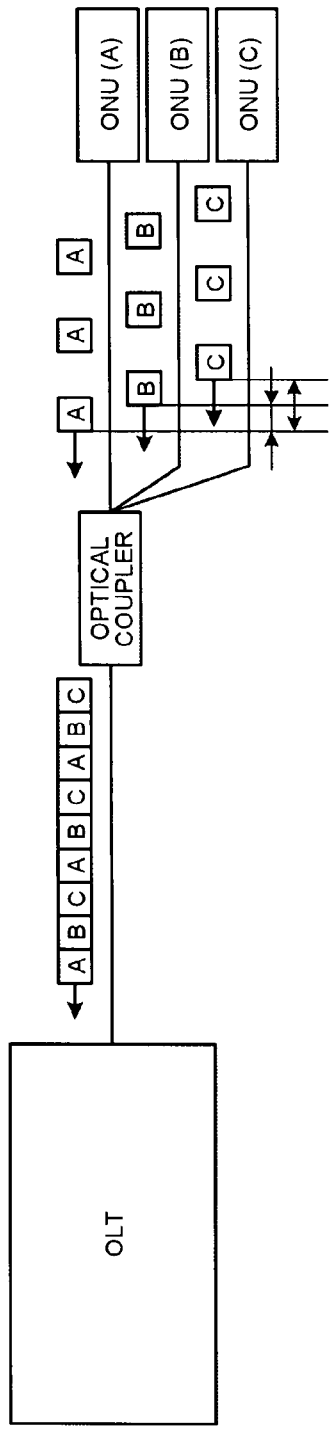
FIG.3A
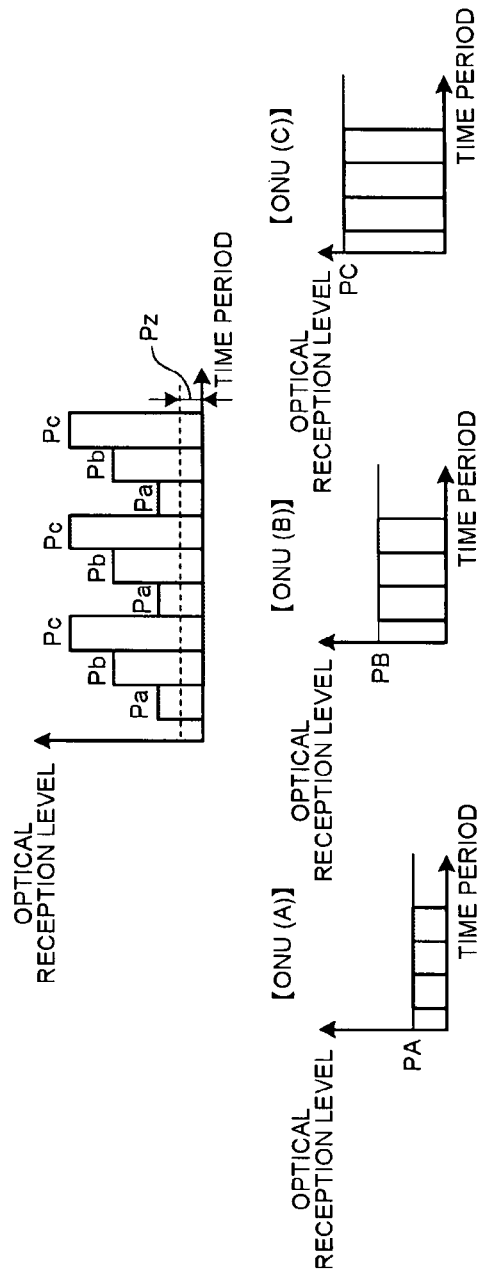
FIG.3B
FIG.3C
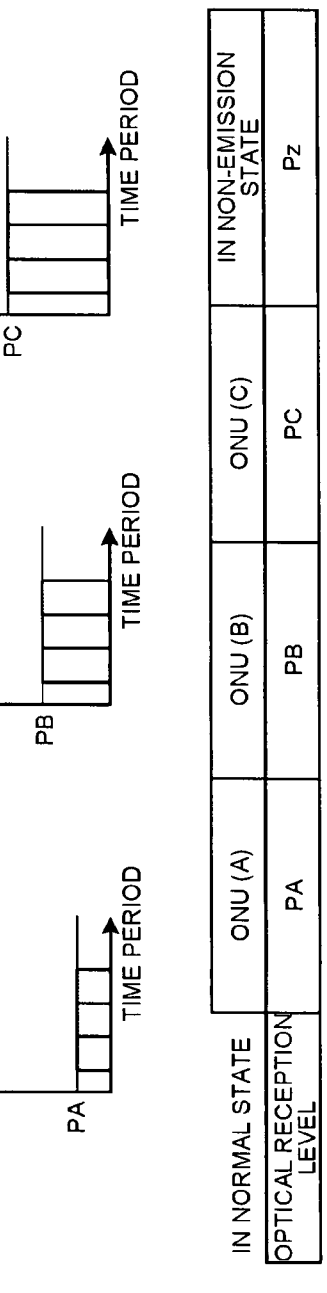
FIG.3D

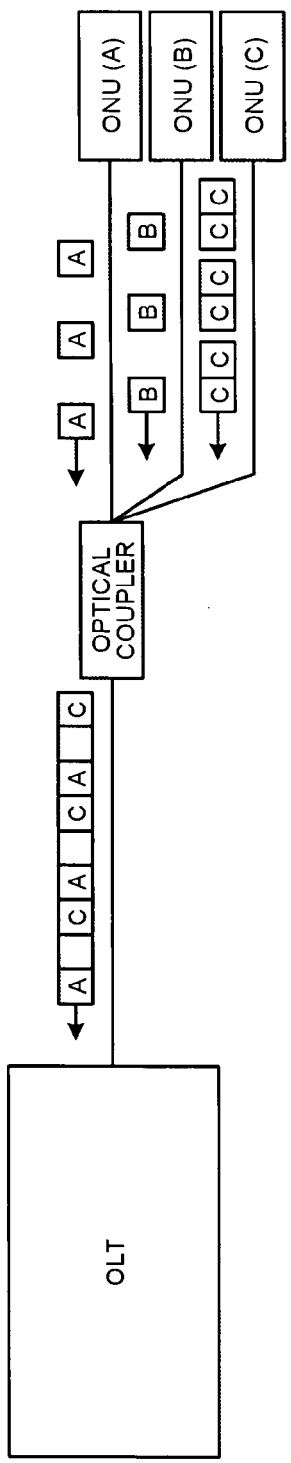
FIG.4A
| | ONU (A) | ONU (B) | ONU (C) | |
|---|---|---|---|---|
| IN NORMAL STATE | | | | |
| OPTICAL RECEPTION LEVEL | PA | PB | PC | IN NON-EMISSION STATE Pz |
| IN ABNORMAL STATE | | | | |
| OPTICAL RECEPTION LEVEL | PA | PX | PC | IN NON-EMISSION STATE Pz |
FIG.4B
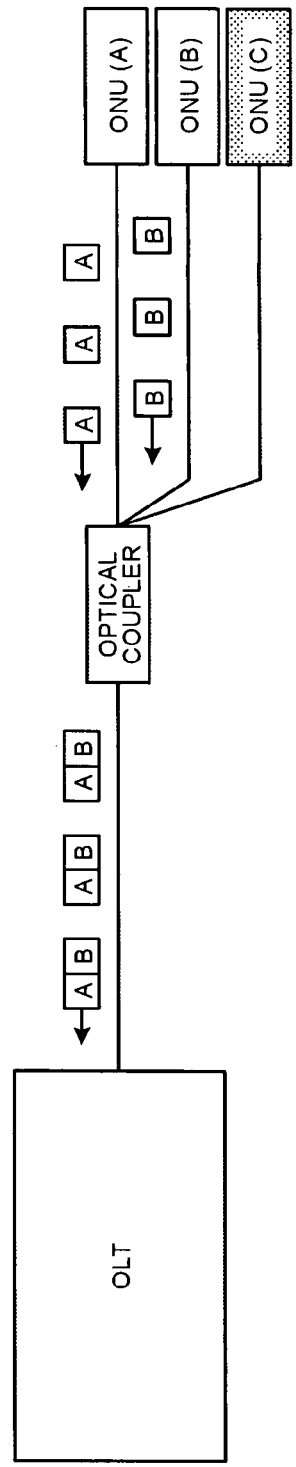
FIG.4C

TECHNIQUE OF IDENTIFYING A DEFECTIVE SUBSCRIBER DEVICE IN A POINT-TO-MULTIPOINT NETWORK WITHOUT STOPPING NORMAL SUBSCRIBER DEVICES

BACKGROUND OF THE INVENTION

1. Field of the Invention

The present invention generally relates to an optical line terminal (OLT) installed in a central office that provides services to a lot of optical network units (ONUs) connected with the OLT in a point-to-multipoint network such as the passive optical network (PON), and more specifically to techniques for identifying at least one of the ONUs which transmits data with a different timing than is enabled by the OLT.

2. Description of the Related Art

A passive optical network (PON) is commonly used as one of the technologies to realize a fiber to the home (FTTH) that brings an optical fiber from a central office of, for example, a telecommunication carrier into each customer premise. In the PON, a single optical fiber is branched by using a branching device (e.g., an optical coupler) and brought into a plurality of customer premises. As shown in FIG. 11, the PON includes a point-to-multipoint type structure of an optical subscriber end terminal (i.e., an optical line terminal (OLT)) inside the central office and a plurality of optical network end terminals (i.e., optical network units (ONUs)) that are installed in the customer premises.

As shown in FIG. 11, the OLT transmits a transmission enable data (a data that enables a time period for transmitting data) to each ONU (see (1) of FIG. 11). Each ONU transmits a data to the OLT with timing enabled by the transmission enable data (see (2) of FIG. 11), thus carrying out communication between the OLT and each ONU. As shown in FIG. 11, since data from many ONUs are optically multiplexed in a single optical fiber, if all the data are transmitted with enabled timing, a data collision is not likely to occur (see (3) of FIG. 3).

However, in the PON, because the data (lights) from ONUs are optically multiplexed in a single optical fiber, if the ONUs installed in the customer premises (or the customer premises ONUs) include a defective ONU that transmits data during a disabled time period, a data collision is likely to occur with data that are transmitted from other normal ONUs. The defective ONU must be identified and transmission of data by the defective ONU must be stopped for resuming the communication that is hampered due to the defective ONU.

Various technologies have been suggested for identifying the defective ONU. For example, in a method shown in FIG. 12, upon detecting that data that is transmitted during the time period enabled for an ONU (B) cannot be received (see (1) of FIG. 12), the OLT exercises a transmission stop control to stop data transmission from all the ONUs (see (2) of FIG. 12). Next, the OLT enables data transmission only from an ONU (A) to confirm whether the ONU (A) is operating normally (see (3) of FIG. 12). Next, if the ONU (A) is operating normally, the OLT enables data transmission only from the ONU (B) to confirm whether the ONU (B) is operating normally (see (4) of FIG. 12). Next, if the ONU (B) is operating normally, the OLT enables data transmission only from an ONU (C) to confirm whether the ONU (C) is operating normally (see (5) of FIG. 12). In the example shown in FIG. 12, because a defect in the operation of the ONU (C) is confirmed, next the OLT stops data transmission only from the ONU (C) and enables data transmission from the other ONU (A) and (B) (see (6) of FIG. 12).

Similarly, in a method that is disclosed in Japanese Patent Laid-open Application No. 2002-359596, upon detecting that data transmitted within a enabled time period cannot be received, first the OLT transmits to all the ONUs, a command that instructs not to carry out allocation of communication bands. Next, the OLT sequentially confirms whether each ONU is operating normally.

However, in the conventional technology mentioned earlier, the communication between the OLT and each normal ONU must be stopped for identifying the defective ONU. In other words, in the conventional technology, in order to identify an defective ONU, the OLT must exercise the transmission stop control to stop data transmission from all the ONUs. Specifically, in a prior system of FIG. 12, identifying an defective ONU, e.g., (C) requires the transmission stop control, causing communication between the OLT and normal ONU (A) and communication between the OLT and normal ONU (B) to be stopped.

SUMMARY OF THE INVENTION

It is an object of the present invention to at least partially solve the problems in the conventional technology.

According to an aspect of the invention, in a point-to-multipoint network comprising a central terminal and a plurality of subscriber terminals (hereinafter, referred to as "STs") wherein each of the STs is enabled to send a signal only within a time period enabled for the ST by the central terminal, there is provided a method of identifying a defective one of the STs which causes signals from the STs to be received colliding with each other in the central terminal. The method comprises the steps of, for each of a given series of time periods, measuring an optical reception level of an optical fiber signal in the time period; storing, in advance, in table means at least the reception level of a received signal from each of the STs in association with the ST, the reception level being measured in a normal state where signals from the STs are exclusively received; for each of the given series of time periods, deciding whether a signal from one of the STs associated with the time period is exclusively received with no collision with any other signal; and if the signal from an ST associated with the time period is not exclusively received, identifying the defective ST based on a measured optical reception level for the time period, a stored reception level of an ST stored in the table means and associated with the time period and the table means.

According to another aspect of the invention, there is provided a central terminal (CT) or a system provided therein which is connected with one end of an optical fiber branched and connected to a plurality of subscriber terminals (STs) in a point-to-multipoint network comprising the CT and the plurality of STs, wherein each of the STs is enabled to send a signal only within a time period enabled for the ST by the CT. The CT or the system identify a defective one of the STs which causes signals from the STs to be received colliding with each other in the central terminal. The CT or the system provided therein comprises measuring means, operative for each of a given series of time periods, for measuring an optical reception level of an optical fiber signal in the time period; table means that at least stores the reception level of a received signal from each of the STs in association with the ST, the reception level being measured by the measuring means in a normal state where signals from the STs are exclusively received; means, operative for each of the given series of time periods, for deciding whether a signal from one of the STs associated with the time period is exclusively received with no collision with any other signal; and means, responsive to a decision that the signal from an ST associated with the time period is not exclusively received, for identifying the defective ST based on a measured optical reception level for the time period, a stored reception level of an ST stored in the table means and associated with the time period and the table means.

According to further aspect of the invention, there is provided a program storage medium readable by a device which is provided in a central terminal (CT) and which is connected with one end of an optical fiber branched and connected to a plurality of subscriber terminals (STs) in a point-to-multipoint network comprising the CT and the plurality of STs, wherein each of the STs is enabled to send a signal only within a time period enabled for the ST by the CT, the medium tangibly embodying a program of instructions executable by the device to perform method steps for identifying a defective one of the STs which causes signals from the STs to be received colliding with each other in the central terminal. The method comprises the steps of, for each of a given series of time periods, measuring an optical reception level of an optical fiber signal in the time period; storing, in advance, in table means at least the reception level of a received signal from each of the STs in association with the ST, the reception level being measured in a normal state where signals from the STs are exclusively received; for each of the given series of time periods, deciding whether a signal from one of the STs associated with the time period is exclusively received with no collision with any other signal; and if the signal from an ST associated with the time period is not exclusively received, identifying the defective ST based on a measured optical reception level for the time period, a stored reception level of an ST stored in the table means and associated with the time period and the table means.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 1A and 1B are schematic diagrams for explaining an overview and a salient feature of a defective ONU-identifying system according to a first embodiment of the present invention;

FIGS. 3A to 3D are schematic diagrams for explaining an optical reception level-storage unit;

FIGS. 4A to 4C are schematic diagrams for explaining a defective ONU-identifying unit;

DETAILED DESCRIPTION OF THE PREFERRED EMBODIMENTS

Figure 2:
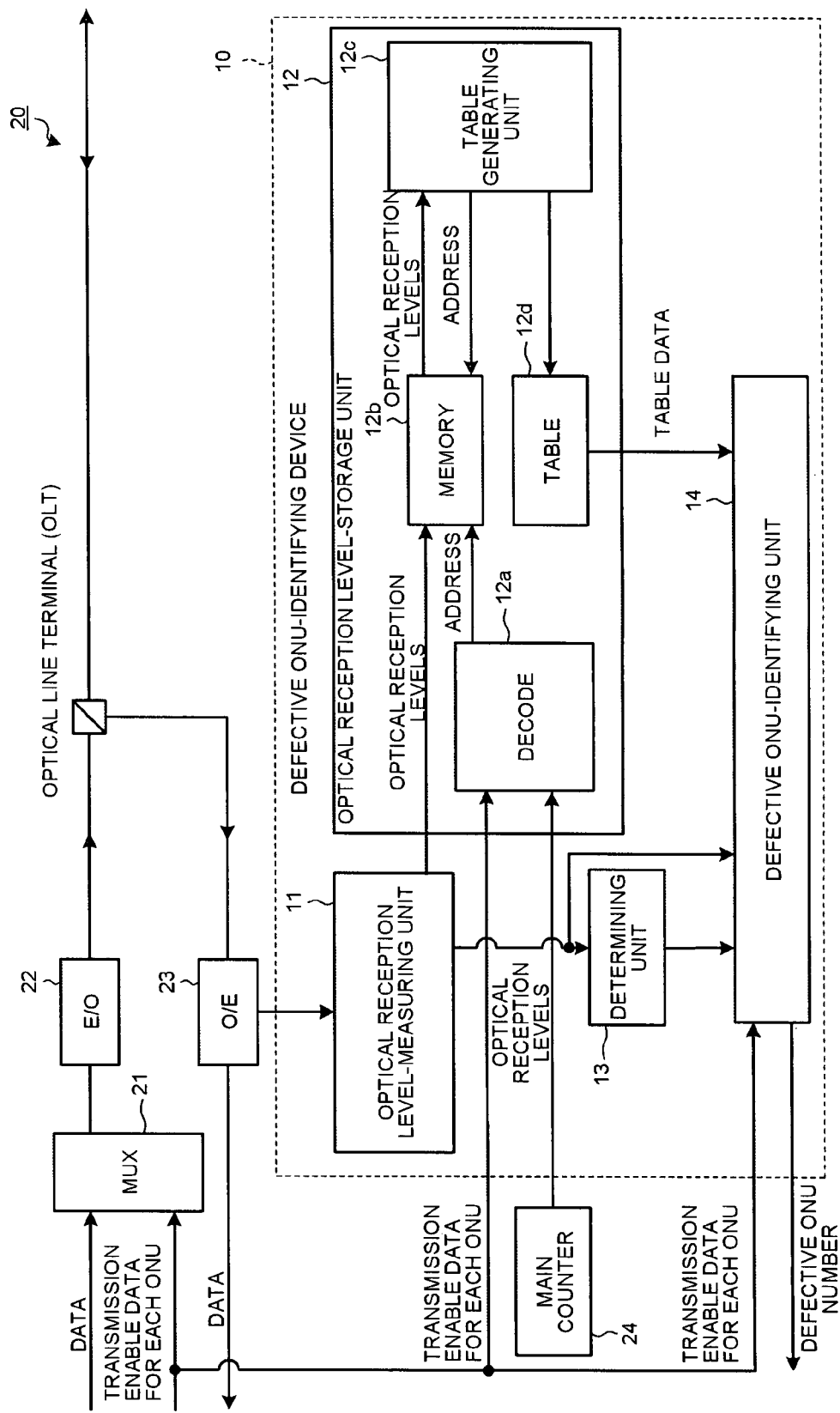
FIG. 2 is a block diagram of an OLT according to the first embodiment.

Exemplary embodiments of the defective Optical Network Unit (ONU) identifying device, the defective ONU identifying program, and the defective ONU identifying method according to the present invention are explained in detail below with reference to the accompanying drawings. Below, main technical terms used in the following description are first described, and then described are an overview, features, the structure, a process sequence and effects of a defective ONU identifying device according to a first embodiment of the invention. Then, other embodiments are explained.

Explanation of Technical Terms

The main technical terms, which are used in the following description, is explained first. Terms "optical line terminal (OLT)" and "optical network unit (ONU)" used in the embodiments explained below are devices that are included in a system that is based on a "passive optical network (PON)". The "PON" is one of the techniques that are used to bring an optical fiber from a central office of, for example, a telecommunication carrier into customer premises. In the PON, a single optical fiber is branched by using a branching device (e.g., optical coupler) and brought into a plurality of the customer premises. The OLT is an optical subscriber end terminal that is installed at the central office, while the ONU is an optical network end terminal that is installed in each customer premise. In other words, the "PON" is the system in which the single optical fiber connected to the OLT is branched and connected to each of a plurality of ONUs.

As described above, in a PON-based system, since a single optical fiber connected to an OLT is branched and connected to many ONUs, a signal to be transmitted from each ONU to the OLT are transmitted in an exclusive time period for the ONU that is enabled by the OLT to avoid collision of the signals in the single optical fiber. To be specific, the OLT transmits a transmission enable data (i.e., a data that enables a time period for transmission of signals) to each ONU and each ONU transmits a signal to the OLT in an exclusive time period enabled for the ONU by the transmission enable data.

In other words, a normal communication is based on the assumption that all the ONUs transmit respective signals in respective exclusive time periods enabled by the OLT. For example, if a defective ONU transmits a signal in a time period other than the time period enabled by the OLT, a collision may occur with the signals transmitted by the other normal ONUs in the single optical fiber, which may impede the communication between the OLT and each normal ONU. For this reason, if such a collision occurs, the ONU which is transmitting signals in time periods other than ones enabled by the OLT must be identified first.

Since the ONU carries out a signal transmission by light emission, transmitting signals in other time periods than are enabled by the OLT is to emit lights in an abnormal manner. Accordingly, in a PON-based system, it is important to have a function of identifying an ONU carrying out the abnormal light emission among the normal ONUs.

First Embodiment

The overview and features of a defective ONU-identifying system according to the first embodiment of the invention is explained with reference to FIGS. 1A and 1B. FIGS. 1A and 1B are schematic diagrams for explaining the overview and features of the defective ONU-identifying system 10 (shown as a defective ONU-identifying device in FIG. 2).

In a system shown in FIG. 1, a single optical fiber with its one end connected to an OLT has the other end thereof branched and connected to each of many ONUs and each ONU uses the light emission to transmit a signal to the OLT in an exclusive time period enabled by the OLT for the ONU. In the system mentioned above, the defective ONU-identifying system 10 identifies a defective ONU carrying out the defective light emission among the ONUs. One of the salient features of the defective ONU-identifying system is that the defective ONU-identifying system identifies the defective ONU without stopping the communication between the OLT and each normal ONU.

A process performed by the defective ONU-identifying system 10 includes a step of measuring and storing optical reception levels of the signals in a normal state in advance and a step of measuring the optical reception levels of the signals during communication and identifying the defective ONU if abnormal signals are detected. Main features of the defective ONU-identifying system are briefly explained in connection with such the two steps as mentioned above.

FIG. 1A is a schematic diagram for explaining the step of measuring and storing the optical reception levels of the signals in a normal state prior to practical operation. As shown in FIG. 1A, first the defective ONU-identifying system measures the optical reception level of a signal in each time period while the OLT can exclusively receive a signal transmitted from each ONU (see (1) of FIG. 1A). For example, the measurement results of the optical reception levels for the signals in a state in which the OLT can exclusively receive a signal transmitted from each of ONUs (A), (B), and (C) are assumed to be Pa, Pb and Pc, respectively. In a normal state or when the signals transmitted from the ONUs can be exclusively received in the OLT, the values of the optical reception levels (Pa, Pb and Pc) differ depending on the ONU due to the attenuation which depends on the distances to the ONUs, and the optical reception level for an identical ONU exhibits a substantially constant value.

Next, the defective ONU-identifying system 10 subtracts from the measured optical reception levels of the signals, an optical reception level during non-emission when all the ONUs do not emit signals, and stores the calculated values for the ONUs corresponding to respective time periods (see (2) of FIG. 1A). For example, the defective ONU-identifying system subtracts the optical reception level during non-emission (Pz) from each of the measured optical reception levels (Pa, Pb and Pc) of the signals and stores the calculated values (PA, PB, and PC) for respective ONUs. Since the optical reception levels (Pa, Pb and Pc) for respective ONUs in a normal state differ depending on the ONU, the calculated values (PA, PB, and PC) also differ depending on the ONU. Further, because the optical reception level in the same ONU are substantially constant, the calculated value (PA, PB or PC) for each ONU is substantially constant.

FIG. 1B is a schematic diagram for explaining the step of suitably measuring the optical reception levels of the signals during communication and identifying a defective ONU if any abnormal signals are detected. As shown in FIG. 1B, the defective ONU-identifying system 10 first determines whether the signals transmitted from the ONUs can be exclusively received in the OLT. Upon determining that among the signals that are transmitted from each ONU, the signals transmitted during a predetermined time period cannot be received, the defective ONU-identifying system 10 measures the optical reception levels of the signals that are transmitted during the predetermined time period (see (1) of FIG. 1B). For example, the defective ONU-identifying system 10 determines whether the signals transmitted from each of the ONU (A), (B), and (C) can be exclusively received in the OLT. Upon determining that the signals transmitted during a predetermined time period (the time period for the ONU (B)) cannot be received, the defective ONU-identifying system 10 measures the optical reception levels of the signals that are transmitted during the time period for the ONU (B).

Next, the defective ONU-identifying system 10 calculates values by subtracting from the measured optical reception levels of the signals, the optical reception levels of the ONU corresponding to the predetermined time period that are stored at the step shown in FIG. 1A and the optical reception levels in the non-emission state (see (2) of FIG. 1B). For example, the defective ONU-identifying system 10 calculates values by subtracting from the measured optical reception levels of the signals, the optical reception levels PB of the ONU corresponding to the time period of the ONU (B) and the optical reception levels Pz in the non-emission state.

Next, the defective ONU-identifying system 10 compares the calculated values with the values that-are stored for the respective ONU at the step shown in FIG. 1A. Based on a comparison result, the ONU, which corresponds to the values that are matching, is identified as the defective ONU by the defective ONU-identifying system 10 (see (3) and (4) of FIG. 1B). For example, the defective ONU-identifying system 10 compares the calculated values with PA, PB, and PC and based on the comparison result, identifies the ONU (C) corresponding to the matching value (PC) as the defective ONU.

The defective ONU-identifying system 10 prior stores the optical reception levels that are measured in a normal state (when the signals transmitted from the respective ONU can be exclusively received in the OLT). Upon determining that the signals cannot be received normally (exclusively), the defective ONU-identifying system 10 uses the prior stored optical reception levels in a normal state to identify the defective ONU. Thus, the defective ONU-identifying system 10 can identify the defective ONU without stopping the communication between the OLT and the normal ONUs.

Figure 5:
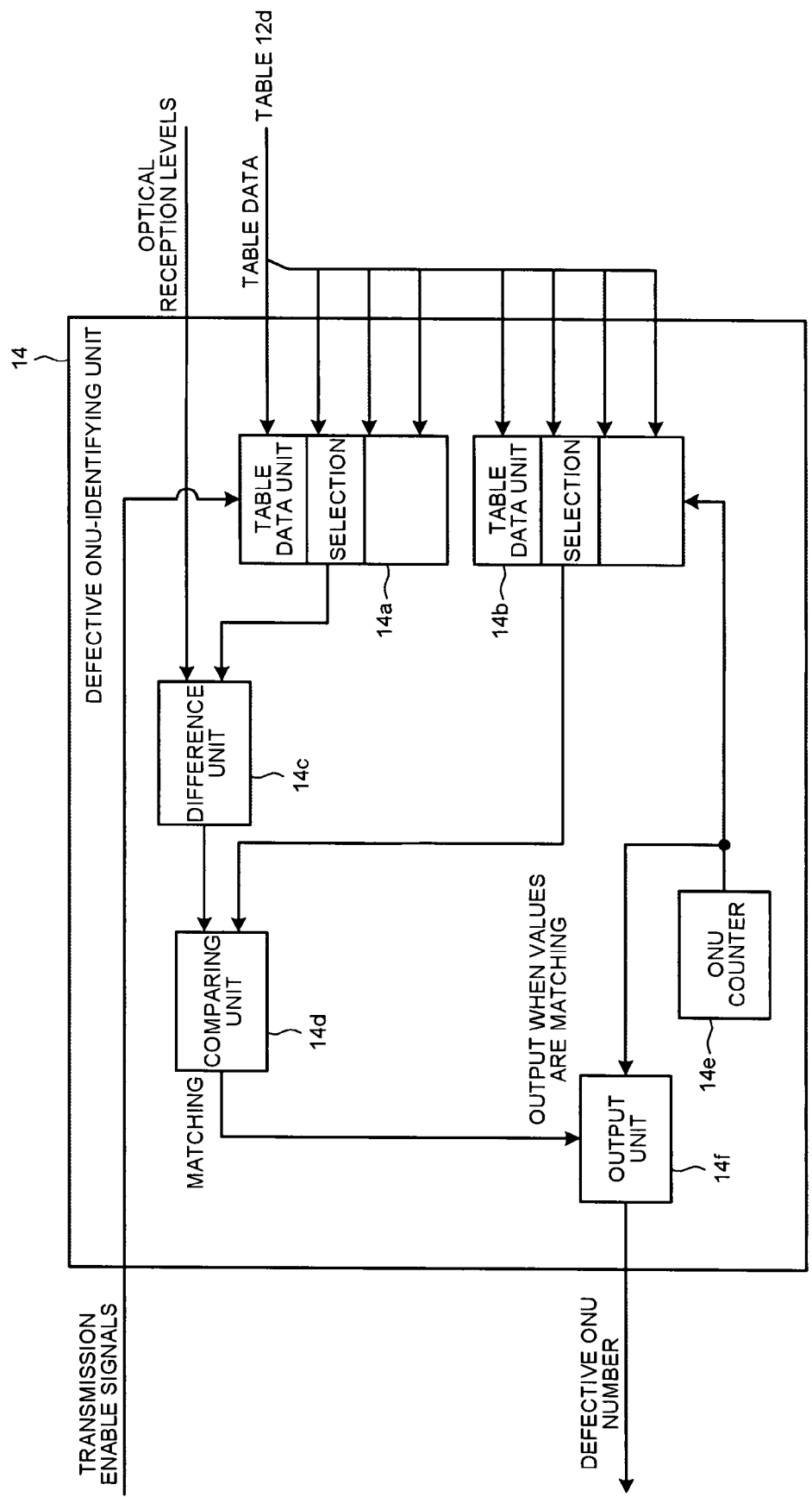
FIG. 5 is a schematic diagram for explaining the defective ONU-identifying unit.

Next, the structure of the defective ONU-identifying system 10 according to the first embodiment is explained with reference to FIGS. 2 to 5. The OLT, which includes the defective ONU-identifying system 10, is explained as an aspect of the first embodiment. However, the present invention is not to be thus limited, and the defective ONU-identifying system 10 can also be structured as a device that differs from the OLT. FIG. 2 is a block diagram of the OLT according to the first embodiment. FIGS. 3A to 3D are schematic diagrams for explaining how data to be stored in an optical reception level-storage unit are found and how the found data are stored in the optical reception level-storage unit. FIG. 4 is a diagram showing how the defective ONU is identified. FIG. 5 is a schematic diagram showing an exemplary structure of the defective ONU-identifying unit 14 of FIG. 2.

As shown in FIG. 2, the OLT 20 according to the first embodiment includes an optical reception level-measuring unit 11, an optical reception level-storage unit 12, a determining unit 13, a defective ONU-identifying unit 14, a system multiplex (MUX) 21, an electrical/optical (E/o) 22, an optical/electrical (O/E) 23, and a main counter 24.

The MUX 21 transmits to each ONU, data received from a network side (the opposite side of the customer premise side viewed from the OLT 20) and transmission enable signals to be transmitted to each ONU. The E/O 22 converts an electrical signal output from MUX 21 into an optical signal and the O/E 23 converts an optical signal from each ONU into an electrical signal. The main counter 24 counts the exclusive time period (the time period that is enabled by a transmission enable signal) for each ONU.

The optical reception level-measuring unit 11 measures the optical reception level of each of the signals received in the OLT. To be specific, when respective signals transmitted from the ONUs can be exclusively received (i.e., received one by one without any conflict) in the OLT, the optical reception level-measuring unit 11 receives a signal during each time period from the O/E 23, measures the optical level of the received signal, and transmits the measured value to the optical reception level-storage unit 12. Further, the optical reception level-measuring unit 11 also transmits the measured optical reception level to the determining unit 13.

The optical reception level-storage unit 12 stores therein the optical reception levels of the signals that are received from the ONUs in a normal state. To be specific, when the signals transmitted from the respective ONU can be exclusively received in the OLT (in a normal state) (see FIG. 3A), the optical reception level-storage unit 12 receives from the optical reception level-measuring unit 11, the measured values of the optical reception levels of the signals during the respective time periods (see FIG. 3B). Next, the optical reception level-storage unit 12 subtracts from the optical reception levels of the received signals, the optical reception level of a signal of a non-emission time when all the ONUs do not emit signals (see FIG. 3C). The optical reception level-storage unit 12 stores therein the calculated values for the ONU corresponding to the respective time periods (see FIG. 3D). Further, the optical reception level-storage unit 12 prior stores therein the optical reception levels for the respective ONU in a normal state before a start of processes that are performed by the determining unit 13 and the defective ONU-identifying unit 14.

As shown in FIG. 2, the optical reception level-storage unit 12 includes a decoder 12a, a memory 12b, a table generating unit 12c, and a table 12d. The decoder 12a receives a transmission enable signal for each ONU and an output signal of the main counter 24, identifies the time period and the ONU corresponding to the time period, and transmits to the memory 12b, an address for temporarily storing the optical reception level of the identified ONU in the memory 12b. The memory 12b uses the optical reception level received from the optical reception level-measuring unit 11 and the addresses received from the decoder 12a to temporarily store therein the optical reception level of each ONU. The table generating unit 12c specifies the address of each ONU to receive the optical reception level for the ONU, subtracts the optical reception level of the non-emission time from each of the optical reception levels, and stores the resultant value in the table 12d. In other words, the optical reception levels of the signals from the ONUs in a normal state are stored in the table 12d. However, the structure of the optical reception level-storage unit 12 and transaction of specific data mentioned above are explained merely as an example, and any specific method can be used that enables to store the optical reception levels of the signals from the ONUs in a normal state. For example, the calculated values can be stored directly in the table 12d without temporarily storing the calculated values in the memory 12b.

The determining unit 13 determines whether the signals transmitted from the ONUs can be exclusively received in the OLT. To be specific, the determining unit 13 receives the optical reception level, of each signal, measured by the optical reception level-measuring unit 11, determines whether the signal can be exclusively received in the OLT, and transmits a determination result to the defective ONU-identifying unit 14. Alternatively, the OLT 20 may be so configured that if the determining unit 13 determines that one of the signals transmitted from the ONUs which is transmitted within a specific or certain time period (or transmitted from a specific OUN) is not exclusively received, the optical reception level-measuring unit 11 measures the optical reception level of the signal transmitted within the specific time period (or from the specific OUN) and transmits the measured optical reception level to the defective ONU-identifying unit 14.

If the determining unit 13 determines that one of the transmitted signals from the ONUs which is transmitted within a specific time period (or from a specific ONU) cannot be exclusively received (i.e., is received together with a signal from any other ONU), the defective ONU-identifying unit 14 identifies the defective ONU. To be specific, upon the determining unit 13 determining that one of the transmitted signals from the ONUs which is transmitted within a specific time period (e.g., a time period B) cannot be exclusively received (see FIG. 4A), after the optical reception level-measuring unit 11 has measured the optical reception level of the signal transmitted within the specific time period B (see FIG. 4B), the defective ONU-identifying unit 14 subtracts from the optical reception levels (PX) of the measured signals, the optical reception level (PB) which are stored in the optical reception level-storage unit 12 and associated with of the ONU corresponding to the specific time period reception level and the optical reception level in the non-emission state (Pz), compares the calculated value with each of respective values (PA, PB and PC in an example of FIG. 4B) for all the ONUs that values are stored in the optical reception level-storage unit 12, and recognizes the ONU corresponding to a value (PA, PB or PC) for which the comparison resulted in a match as the defective ONU (see FIG. 4C).

As shown in FIG. 5, the defective ONU-identifying unit 14 includes a table data unit 14a, a table data unit 14b, a difference unit 14c, a comparing unit 14d, an ONU counter 14e, and an output unit 14f. The table data units 14a and 14b receive an optical reception level for each ONU that are stored in the table 12d of the optical reception level-storage unit 12, and transmit the optical reception level to the difference unit 14c and the comparing unit 14d.

The difference unit 14c receives from the optical reception level-measuring unit 11 (or via the determining unit 13), the optical reception levels of the signals that are transmitted within the above-mentioned specific time period. The difference unit 14c retrieves from the table data unit 14a an optical reception level of an ONU for the specific time period and the and the optical reception level in the non-emission state, and calculates a value to which subtracting from the received optical reception level, the optical reception level of the ONU corresponding to the specific time period and the optical reception level in the non-emission state. The comparing unit 14d compares the value calculated by the difference unit 14c with each of the values (PA, PB and PC in the example of FIGS. 3 and 4) for all the ONUs that are selected from the table data unit 14b, and transmits the comparison result to the output unit 14f. Based on the comparison result transmitted from the comparing unit 14d and the ONU counter 14e, the output unit 14f identifies as the defective ONU, the ONU corresponding to the matching value which is the comparison result, and outputs a defective ONU number. However, the structure of the defective ONU-identifying unit 14 and transaction of specific data mentioned earlier are explained merely as an example, and any specific method can be used that identifies the defective ONU by using an optical reception level measured by the optical reception level-measuring unit 11 and respective optical reception levels for the ONUs that are stored in the optical reception level-storage unit 12. For example, the table data units 14a and 14b are stored in a single storage location without being splitted. Operation of the defective ONU-identifying system 10

Figure 6:
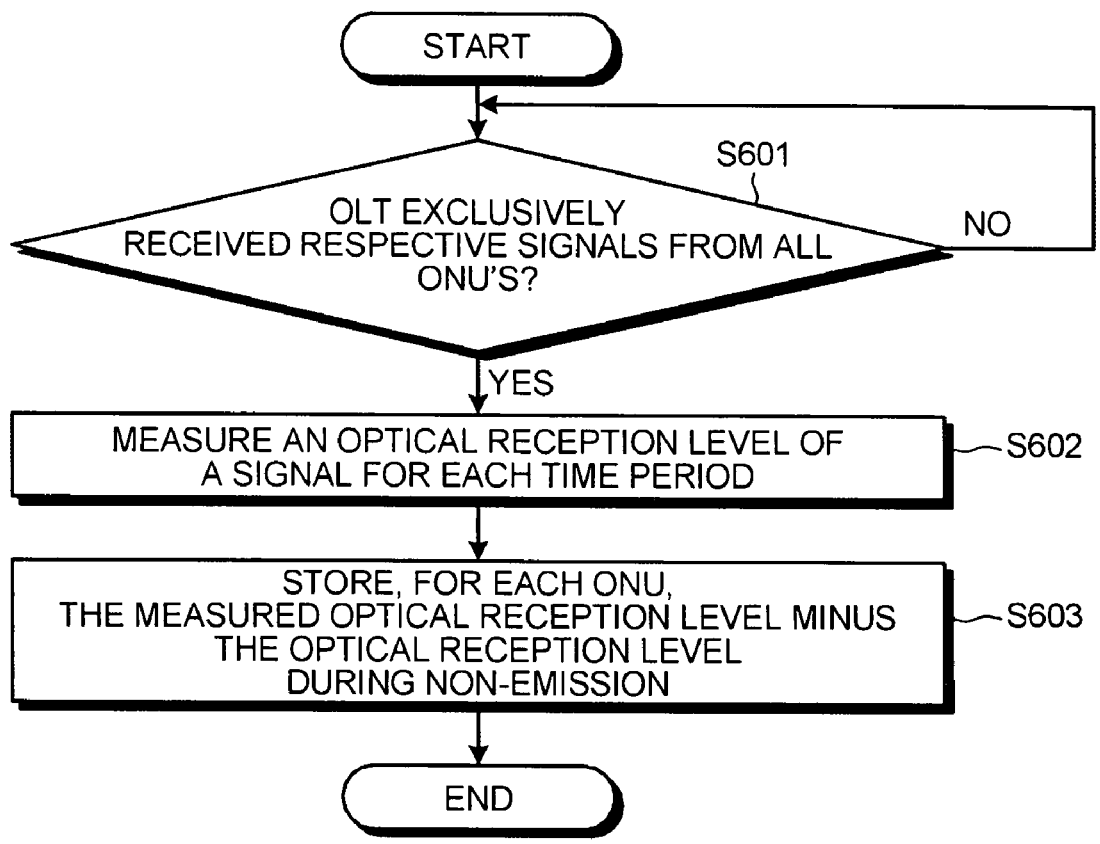
FIG. 6 is a flowchart of an optical reception level storing process.
Figure 7:
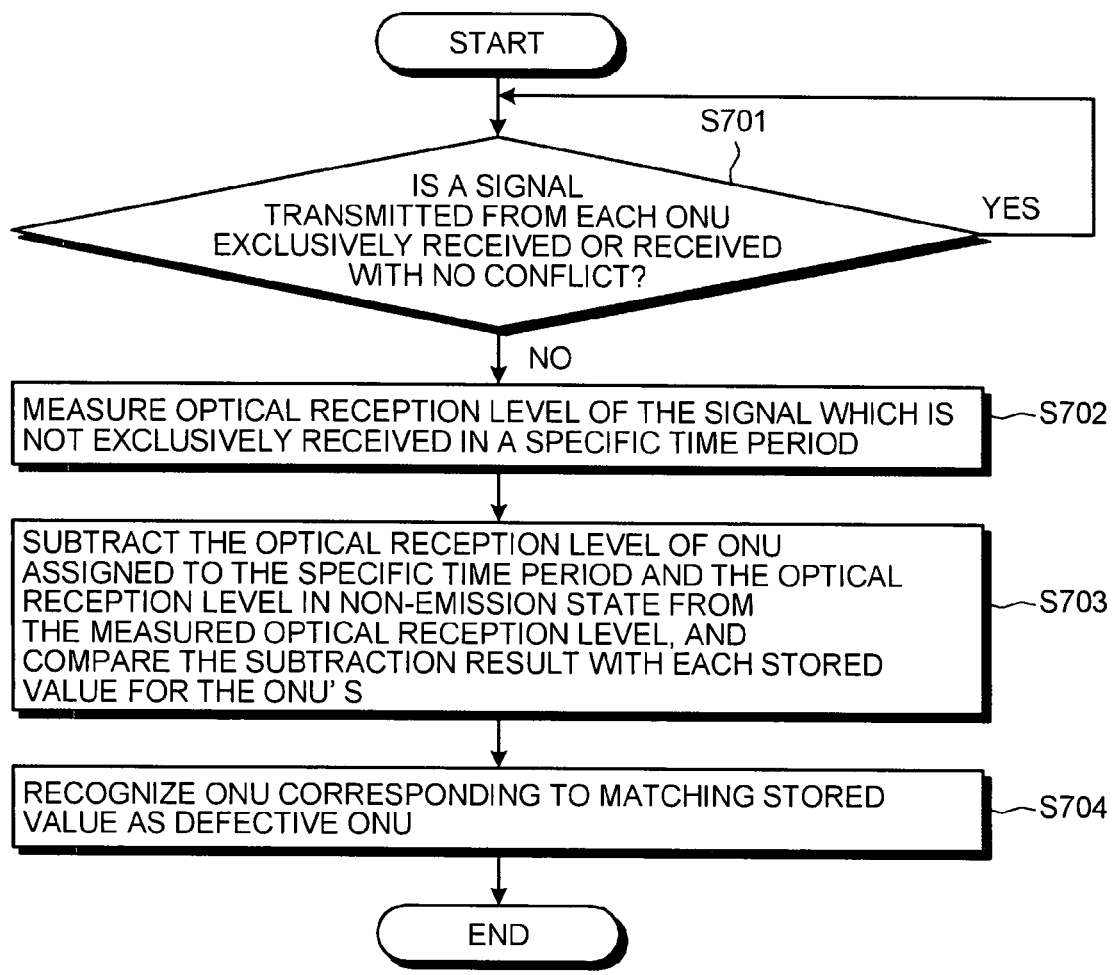
FIG. 7 is a flowchart of a defective ONU identifying process.

The process performed by the defective ONU-identifying system 10 is explained next with reference to FIGS. 6 and 7. FIG. 6 is a flowchart of an optical reception level storing process and FIG. 7 is a flowchart of a defective ONU identifying process.

Optical Reception Level Storing Process

First, the defective ONU-identifying system 10 determines whether the signals transmitted from the ONUs are exclusively received in the OLT (step S601). If the signals are not exclusively received (No at step S601), the defective ONU-identifying system 10 returns to step S601.

If the signals are exclusively received (Yes at step S601), the defective ONU-identifying system 10 measures the optical reception levels for respective time periods (step S602).

Next, the defective ONU-identifying system 10 subtracts from each of the measured optical reception levels of the signals, the optical reception level in the non-emission state where all the ONU do not emit any signals, and stores the subtraction result for the ONU corresponding to the time period for the measured optical reception level (step S603).

[Defective ONU Identifying Process]

First, the defective ONU-identifying system 10 determines whether a signal transmitted from each ONU is exclusively received (step S701). Upon determining that the signal is exclusively received (Yes at step S701), the defective ONU-identifying system 10 returns to step S701.

Upon determining that any signal is not exclusively received in a specific time period (No at step S701), the defective ONU-identifying system 10 measures the optical reception level of the signal for which the exclusive reception was not achieved (step S702).

Next, the defective ONU-identifying system 10 subtracts from the measured optical reception level, an optical reception level in the non-emission state where all the ONU are emitting no light and the optical reception level in the non-emission state, and compares the subtraction result with each of respective prior stored values for the ONUs (step S703).

Next, the defective ONU-identifying system 10 recognizes as the defective ONU, the ONU corresponding to a value (or an optical reception level) that matches the subtraction result in the comparison (step S704).

Thus, the defective ONU-identifying system 10 according to the first embodiment can identify the defective ONU without stopping the communication between the OLT and each of normal ONUs.

Thus, the defective ONU-identifying system 10 prior stores the optical reception levels of the signals that are measured in a normal state, and upon determining that a signal is not received normally in a specific time period, uses the prior stored optical reception levels to identify the defective ONU. Accordingly, the defective ONU can be identified without stopping the communication between the OLT and each normal ONU.

Second Embodiment

Identifying the defective ONU upon determining that a signal transmitted either within a specific time period or from a specific ONU cannot be exclusively received is explained in the first embodiment. However, the present invention is not limited to such embodiments as described above, but can be similarly adapted to identify the defective ONU upon determining that signals transmitted within two or more time periods cannot be exclusively received.

Figure 8:
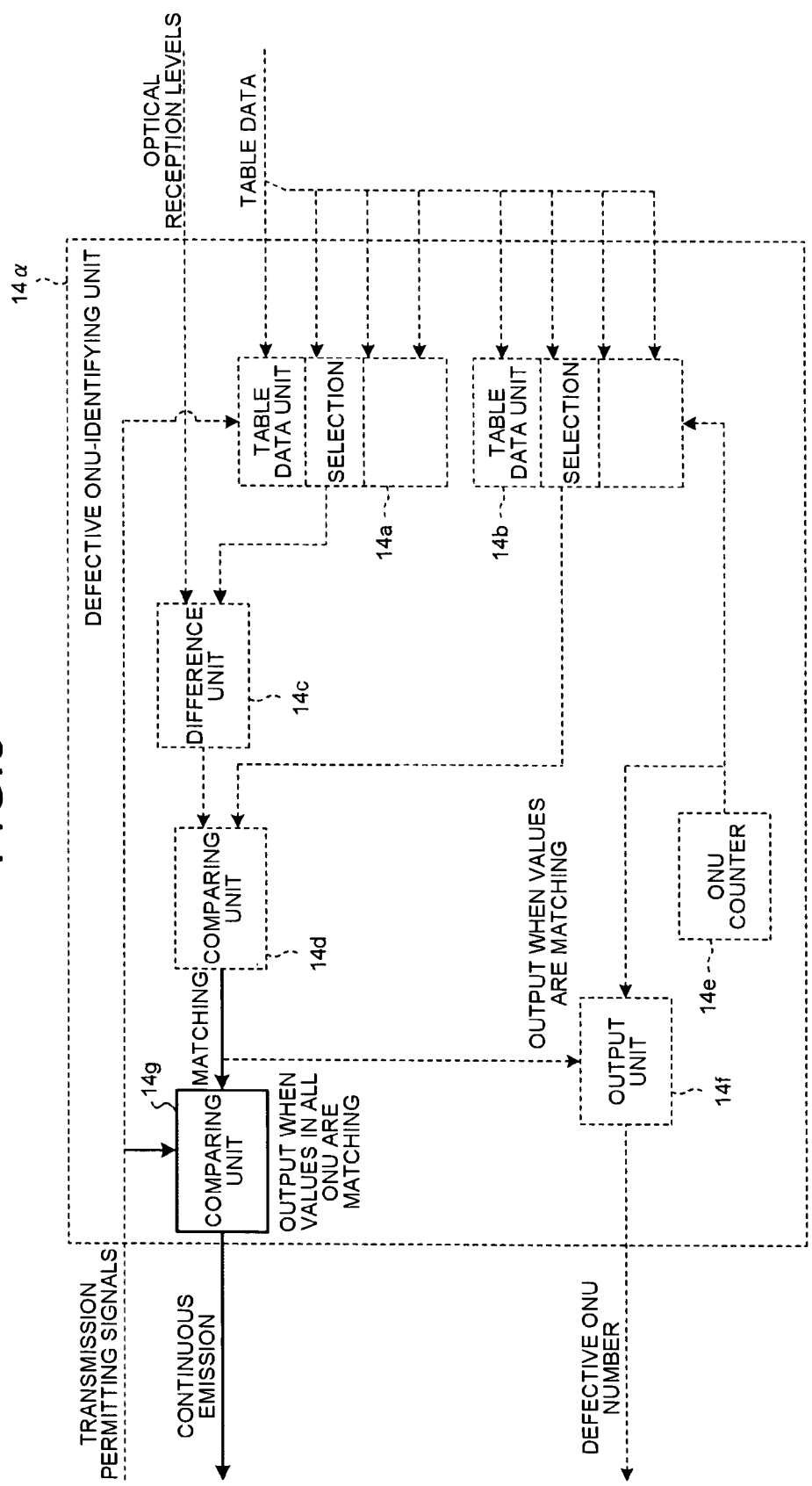
FIG. 8 is a block diagram for explaining a defective ONU-identifying unit according to a second embodiment of the present invention.

FIG. 8 is a schematic diagram showing an exemplary structure of a defective ONU-identifying unit according to the second embodiment of the invention. The defective ONU-identifying unit 14α of FIG. 8 is identical to the defective ONU-identifying unit 14 of FIG. 5 except that a comparing unit 14g has been added in FIG. 8.

According to the second embodiment of the invention, if the determining unit 13 determines that all the signals except a signal received in a time period for a specific ONU (or received from a specific ONU) cannot be received exclusively, the defective ONU-identifying system causes the optical reception level-measuring unit 11 to measure the optical reception levels of the signals received colliding with each other, and subtracts from a measured optical reception level for each of the time periods in which signals were not exclusively received, the stored optical reception level of the ONU corresponding to the time period and the stored optical reception level in the non-emission state. The stored optical reception level and the stored optical reception level are stored data stored in the optical reception level storage unit 12. Next, the defective ONU-identifying system compares each of the calculated values with the respective stored values for the ONUs that are stored by and in the optical reception level-storage unit 12 and identifies the ONU corresponding to the matching stored value in the comparison as the ONU that carries out continuous emission.

In this case, if all the comparison results transmitted from the comparing unit 14d are the same value, the comparing unit 14g identifies the ONU corresponding to the same value as the ONU that carries out continuous emissions, and outputs the defective ONU number. However, the structure of the comparing unit 14g and transaction of specific data mentioned earlier are explained merely as an example.

According to the second embodiment, upon determining that two or more signals among the signals transmitted from the ONUs cannot be received exclusively, the defective ONU-identifying system measures the optical reception levels of the signals that are received colliding with each other in two or more time periods, and subtracts from each of the respective measured optical reception levels for the two or more time periods, the stored optical reception level of the ONU corresponding to the time period and the optical reception levels in the non-emission state. Next, the defective ONU-identifying system compares each of the calculated values with the stored values for the ONUs and, if all the comparisons yield a single optical reception level, identifies the ONU corresponding to the single optical reception level as the defective ONU that carries out continuous emission. Thus, the defective ONU that carries out continuous emission can be identified without stopping the communication between the OLT and each ONU.

Third Embodiment

The method to identify the defective ONU that carries out defective emission is explained in the first and the second embodiments. However, the present invention is not thus limited, and can be similarly applied to a method that additionally determines aging of the ONU. A method to determine aging of the ONU is specifically explained as a third embodiment of the present invention.

Figure 9:
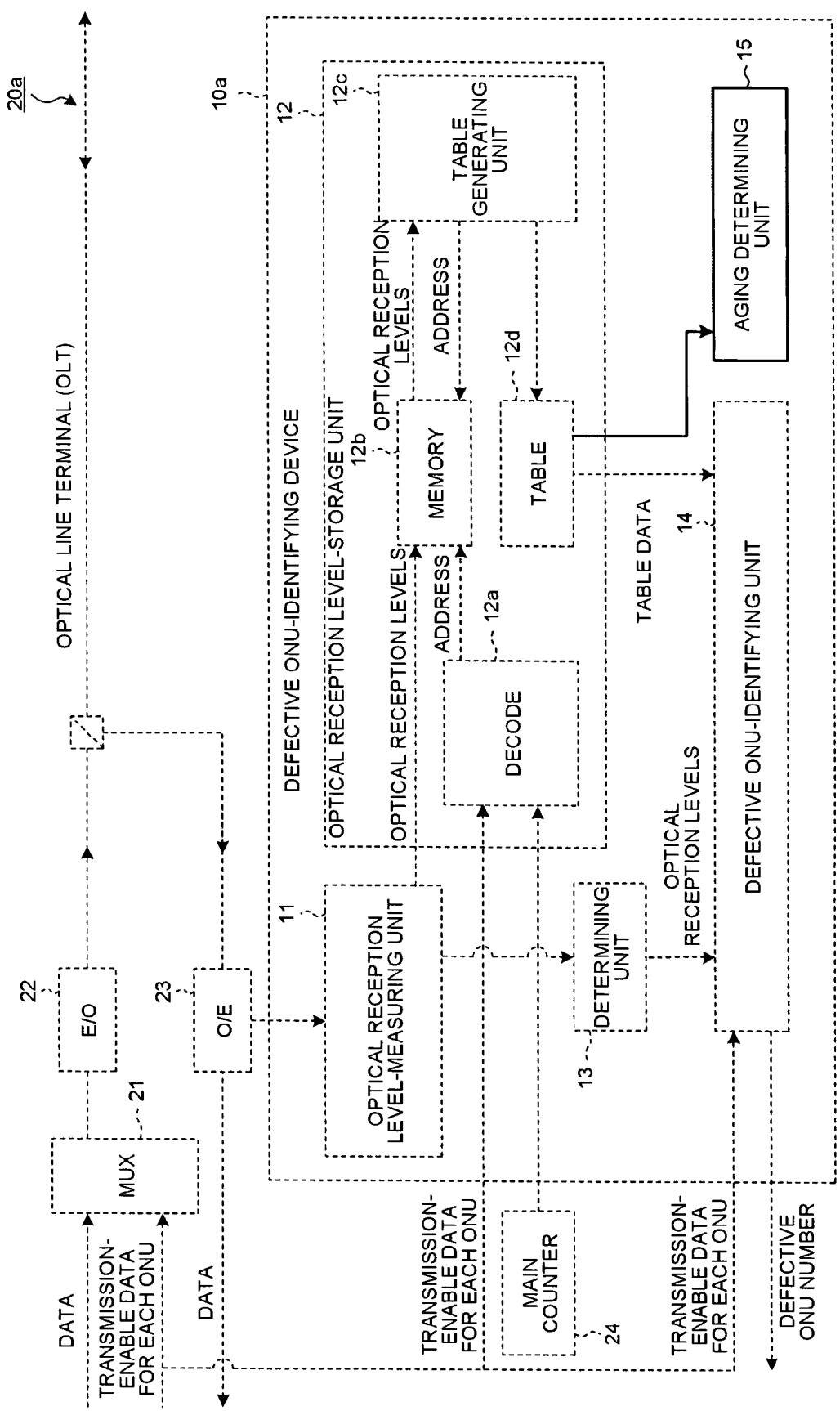
FIG. 9 is a block diagram of an OLT according to a third embodiment of the present invention.

FIG. 9 is a schematic diagram showing an exemplary arrangement of an optical line terminal (OLT) 20a according to a third embodiment of the invention. In FIG. 9, the OLT 12a includes a defective ONU-identifying system 10a, which is identical to the defective ONU-identifying system 10 of FIG. 2 except that an aging determining unit 15 has been added to the defective ONU-identifying system 10a in FIG. 9. Based on the respective stored values stored for the ONUs by the optical reception level-storage unit 12 (the table 12d), the aging determining unit 15 determines aging of the ONUs.

To be specific, the aging determining unit 15 sets, for each ONU, a lower limit and an upper limit of the optical reception level, and stores the lower and upper limits in an appropriate storage location in association with each ONU. When the respective optical reception levels stored in the table 12d for the ONU in a normal state are updated for maintenance or the like, the aging determining unit 15 compares the value(s) of the optical reception level(s) for each ONU with the lower and upper limits for the ONU. If the optical reception level(s) of the ONU is (are) lower than the lower limit or higher than the upper limit, the aging determining unit 15 determines that aging of the ONU has occurred.

In the above mentioned comparison with the lower limit and the upper limit, a single or more values of the optical reception level(s) for each ONU may be used. In case where a single value is used, the single value is used as it is for the comparison. On the other hand, in case where a plurality of values are used, the means of the plurality of values may be used for the comparison. Further, if the comparison results in a determination of aging of the ONU, the same aging test may be made by using another value or another group of values for the ONU in order to make certain the decision by the aging determining unit 15.

Also, in the embodiment 3, the aging determining unit 15 has used both of the lower limit and the upper limit. However, only one of them may be used.

Further, determination of aging by the aging determining unit 15 is not to be limited to the method mentioned earlier. For example, the aging determining unit 15 may periodically (in a time sequence) store for each ONU in the table 12d, the optical reception level of the signal transmitted by normal emission. When the optical reception levels stored in the table 12d for the ONUs in a normal state are updated for maintenance for example, the aging determining unit 15 preferably examines the values of the optical reception levels stored for each ONU. If signs of aging are observed in the stored optical reception levels for one of the ONUs; e.g., if the optical reception levels are gradually lowering as the time passes and the lowering level has sharply increased, the aging determining unit 15 determines that aging has occurred in the ONU. The present invention can also be implemented in other methods.

According to the third embodiment, based on the values that are stored for each ONU, the defective ONU-identifying system determines aging of the ONU.

Various Modifications

The defective ONU-identifying systems according to the first to the third embodiments have been explained. However, the invention in its broader aspects is not limited to the specific details and representative embodiments shown and described herein. Accordingly, various modifications may be made.

All the automatic processes explained in the above embodiments (for example, updating of the table 12d that stores therein the optical reception levels) can be, entirely or in part, carried out manually (for example, updating by inputting a command etc.). The sequence of processes, the sequence of controls, specific names, and data including various parameters can be changed as required unless otherwise specified.

The constituent elements of the device illustrated are merely conceptual and may not necessarily physically resemble the structures shown in the drawings (for example, FIG. 2, FIG. 5 etc.). For instance, the device need not necessarily have the structure that is illustrated. The device as a whole or in parts can be broken down or integrated either functionally or physically in accordance with the load or how the device is to be used. The process functions performed by the apparatus are entirely or partially realized by a Central Processing Unit (CPU) or a program executed by the CPU or by a hardware using wired logic.

Figure 10:
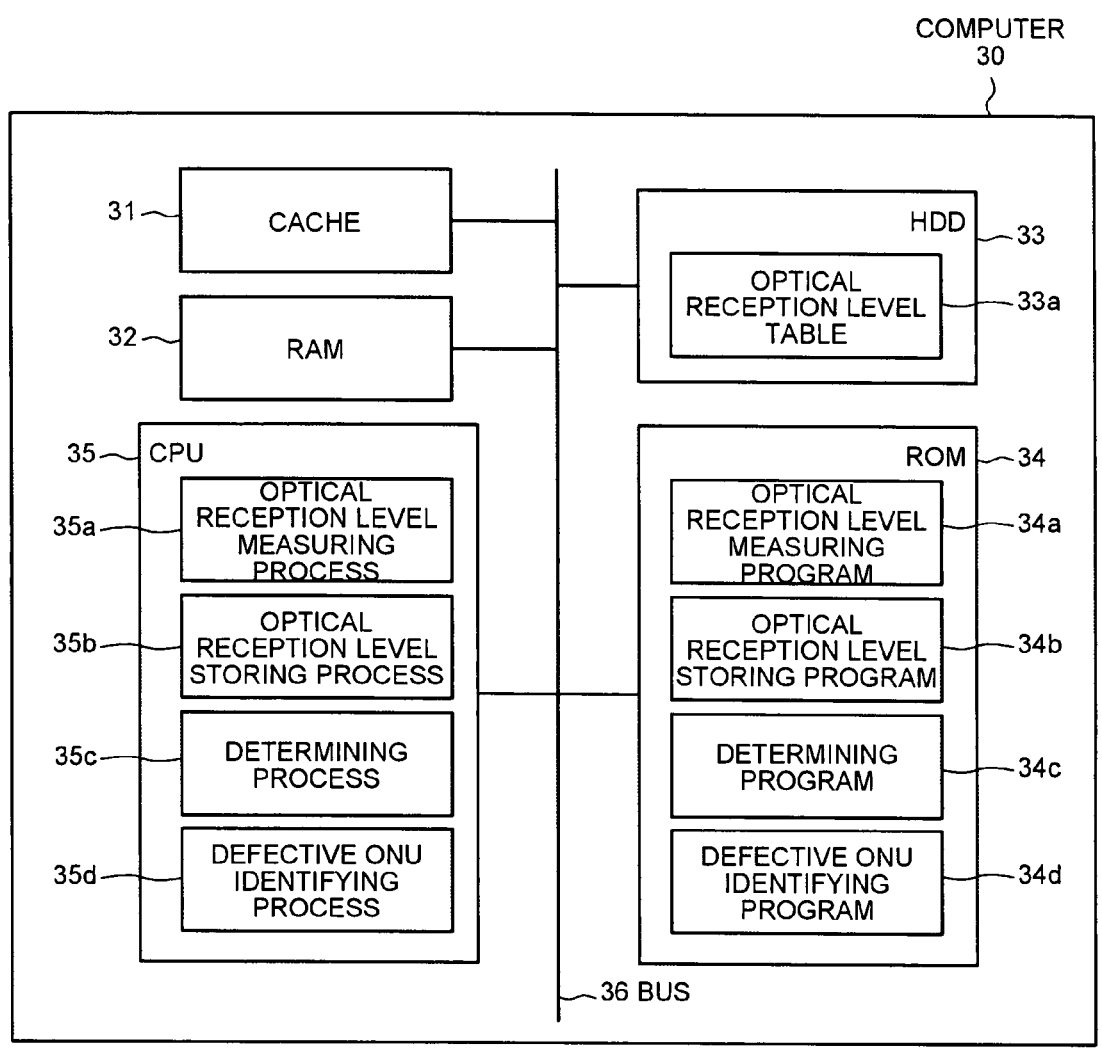
FIG. 10 is a functional block diagram of a computer that executes a defective ONU identifying program according to an arbitrary embodiment of the present invention.
Figure 11:
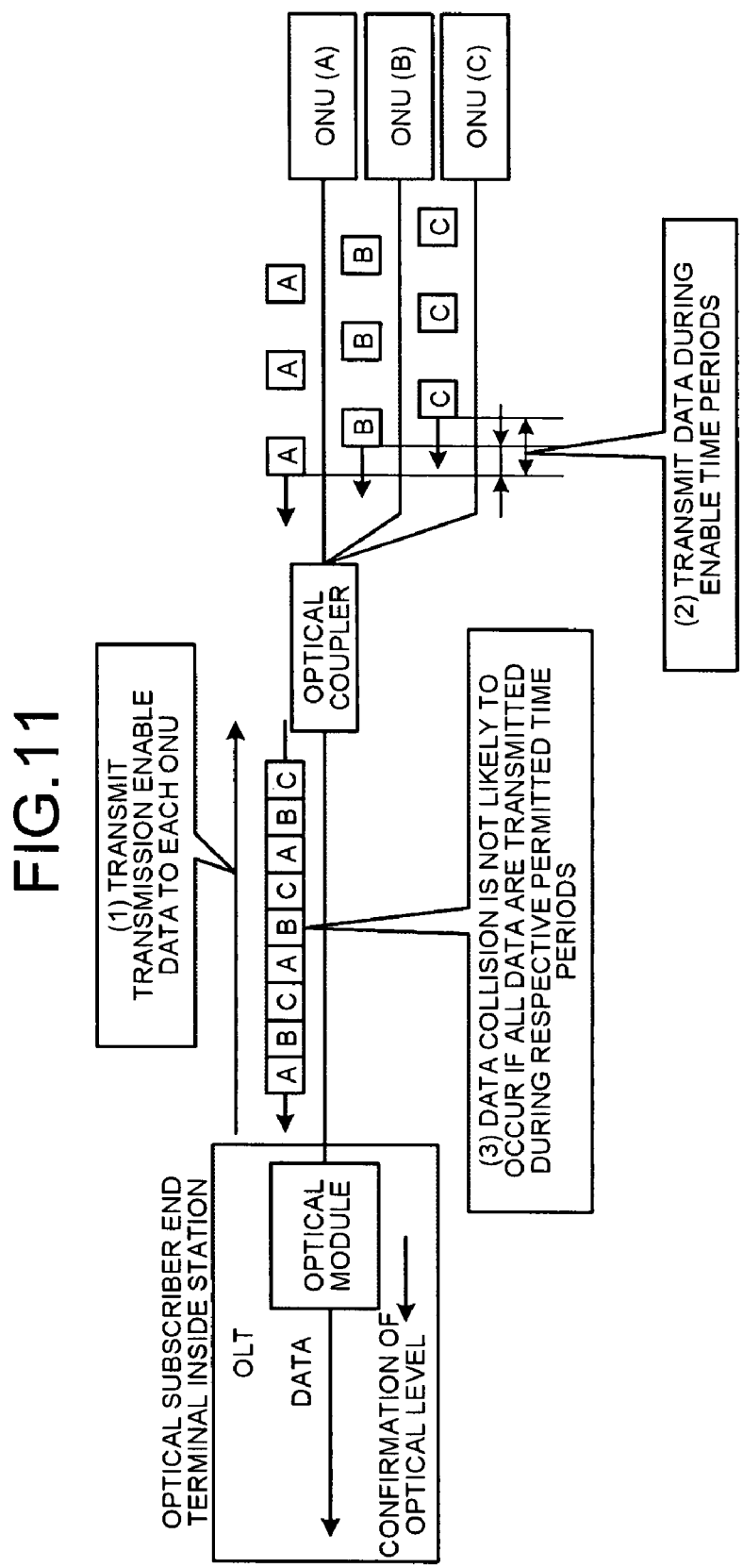
FIG. 11 is a schematic diagram for explaining a conventional technology.
Figure 12:
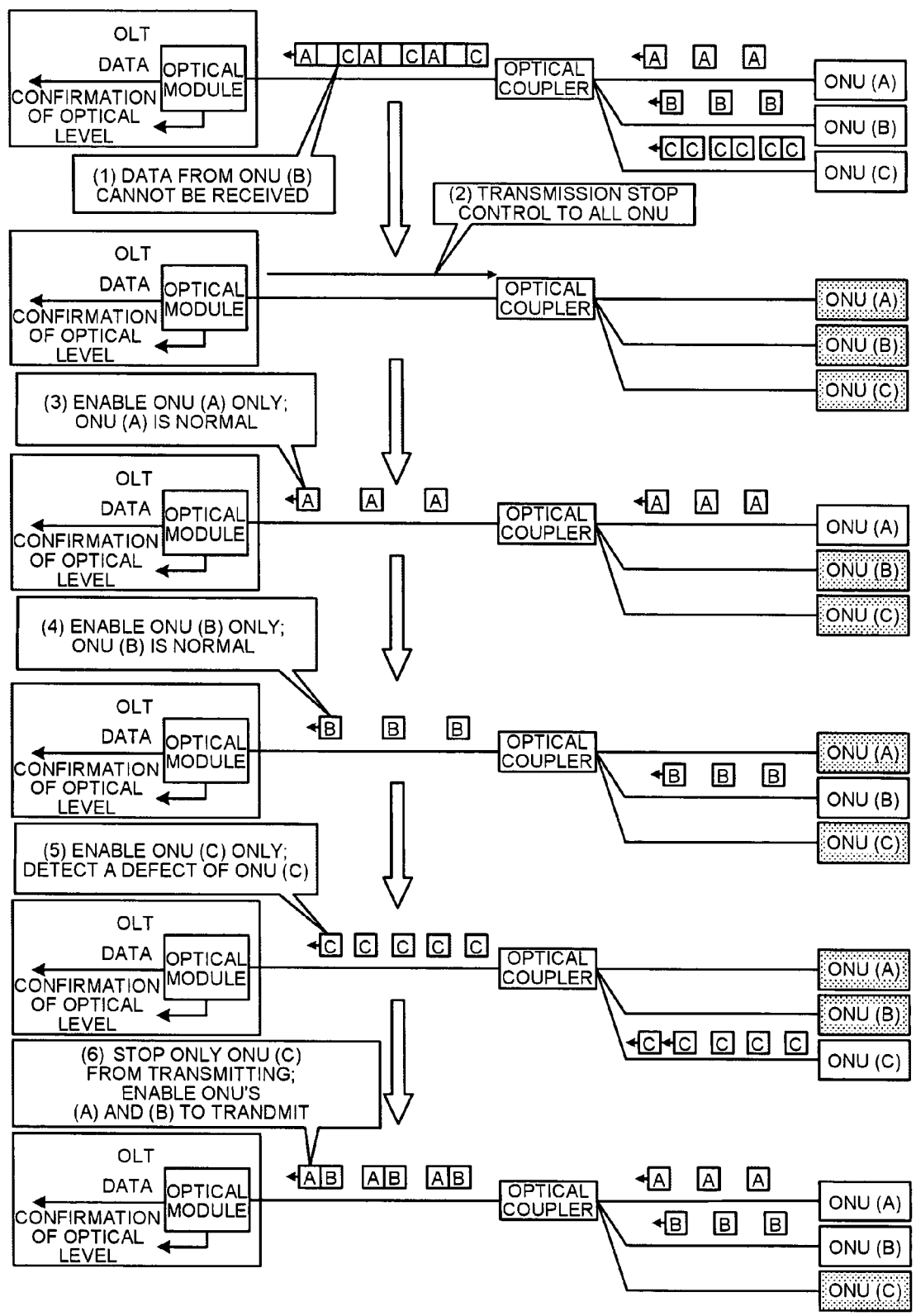
FIG. 12 is a schematic diagram for explaining the conventional technology.

Various processes explained in the embodiments mentioned earlier can be realized by executing a prior formulated computer program using a computer such as a personal computer or workstation. An example of a computer, which executes a defective ONU identifying program that includes functions similar to the functions of the defective ONU-identifying system in the first embodiment, is explained next. FIG. 10 is a functional block diagram of the computer that executes the defective ONU identifying program.

As shown in FIG. 10, a computer 30 includes a cache 31, a Random Access Memory (RAM) 32, a Hard Disk Drive (HDD) 33, a Read Only Memory (ROM) 34, and a CPU 35 that are connected by a bus 36. The ROM 34 prior stores therein an optical reception level measuring program 34a, an optical reception level storing program 34b, a determining program 34c, and a defective ONU identifying program 34d that exhibit functions similar to the functions of the defective ONU-identifying system 10.

As shown in FIG. 10, the optical reception level measuring program 34a, the optical reception level storing program 34b, the determining program 34c, and the defective ONU identifying program 34d are read by the CPU 35 and executed, thus causing the optical reception level measuring program 34a, the optical reception level storing program 34b, the determining program 34c, and the defective ONU identifying program 34d to function as an optical reception level measuring process 35a, an optical reception level storing process 35b, a determining process 35c, and a defective ONU identifying process 35d respectively. The optical reception level measuring process 35a, the optical reception level storing process 35b, the determining process 35c, and the defective ONU identifying process 35d correspond respectively to the optical reception level-measuring unit 11, the optical reception level-storage unit 12, the determining unit 13, and the defective ONU-identifying unit 14 that are shown in FIG. 2.

As shown in FIG. 10, the HDD 33 includes an optical reception level table 33a. The optical reception level table 33a corresponds to the table 12d that is shown in FIG. 2.

The optical reception level measuring program 34a, the optical reception level storing program 34b, the determining program 34c, and the defective ONU identifying program 34d mentioned earlier need not be always stored in the ROM 34. For example, the optical reception level measuring program 34a, the optical reception level storing program 34b, the determining program 34c, and the defective ONU identifying program 34d can be stored in a "portable physical medium" such as a Flexible Disk (FD), a Compact Disk-Read Only Memory (CD-ROM), a Magneto Optical (MO) disk, a Digital Versatile Disk (DVD), an Integrated Circuit (IC) card etc. that is inserted into the computer 30, a "fixed physical medium" such as an HDD that can be included inside or outside the computer 30, or "another computer (or server)" that is connected to the computer 30 via a public line, Internet, a Local Area Network (LAN), a Wide Area Network (WAN) etc. The computer programs can be read by the computer 30 from the media and executed.

In the above description, we used the terms "OLT" and "ONU". However, the invention can be applied to a passive optical network comprising a central office terminal (or a central connection endpoint) and multiple subscriber terminals (or peripheral connection endpoints) that are connected to the central office terminal through an optical fiber and one or more unpowered optical splitters. Thus, in the above description, the terms "OLT" and "ONU" may be read as "central office terminal" and "subscriber terminal", respectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system having a plurality of subscriber terminals (STs) each being enabled to send a signal only within a time period enabled for the ST and a central terminal (CT) which is connected with one end of an optical fiber branched and connected to a plurality of said STs, the system comprising:
    a measurement unit, operative for each of a given series of time periods, to measure an optical reception level of an optical fiber signal in the time period;
    a table that at least stores said reception level of a received signal from each of said STs in association with the ST, said reception level being measured by said measurement unit in a normal state where signals from said STs are exclusively received;
    a decision unit, operative for each of said given series of time periods, to decide whether a signal from one of said STs associated with the time period is exclusively received with no collision with any other signal; and
    an identification unit, responsive to a decision that said signal from an ST associated with the time period is not exclusively received, to identify a defective one of said STs which causes signals from said STs to be received colliding with each other in said CT, based on a value obtained by subtracting said stored reception level from said measured optical reception level for the time period.

2. The system according to claim 1, wherein said identification unit identifies an ST associated with said value in said table as said defective ST.

3. The system according to claim 1, wherein said table also stores a non-emission reception level which is a reception level in a case when any ST emits no light, wherein said identification unit uses a value obtained by subtracting said stored reception level and said non-emission reception level from said measured optical reception level for the time period.

4. The system according to claim 3, wherein said identification unit identifies an ST associated with said value in said table as said defective ST.

5. The system according to claim 1, wherein said identification unit, responsive to a decision that signals are not exclusively received in at least successive two of said given series of time periods, to identify a defective ST that carries out continuous emission based on a measured optical reception level for each of said at least successive two time periods, a stored reception level of an ST stored in said table and associated with each of said at least successive two time periods.

6. The system according to claim 5, wherein said at least successive two time periods comprise all the time periods except a time period for a specific ST.

7. The system according to claim 5, wherein said identification unit comprises:
    a subtraction unit to subtract said stored reception level of an ST associated with each of said at least successive two time periods from said measured optical reception level for the time period; and
    wherein said identification unit, responsive to a decision that subtractions by said subtraction unit result in substantially an identical value, identifies an ST associated with said identical value in said table as said defective ST that carries out continuous emission.

8. The system according to claim 6, wherein said identification unit comprises:
    a subtraction unit to subtract said stored reception level of an ST associated with each of said at least successive two time periods from said measured optical reception level for the time period; and
    wherein said identification unit, responsive to a decision that subtractions by said subtraction unit result in substantially an identical value, identifies an ST associated with said identical value in said table as said defective ST that carries out continuous emission.

9. The system according to claim 7, wherein said table also stores a non-emission reception level which is a reception level in a case when any ST emits no light, and wherein said subtraction unit subtracts not only said stored reception level of an ST associated with each of said at least successive two time periods but also said non-emission reception level from said measured optical reception level for the time period.

10. The system according to claim 1, further comprising:
    a memory to store for storing a lower limit and an upper limit for optical reception level of each ST; and
    a determination unit, responsive to an alteration of said stored optical reception level for one of said STs, to determine that said one ST has experienced an aging when an altered stored optical reception level for said one ST is beyond either said lower or upper limit.

11. A central terminal which is connected with one end of an optical fiber branched and connected to a plurality of subscriber terminals (STs) in a point-to-multipoint network comprising the central terminal and the plurality of STs, wherein each of said STs is enabled to send a signal only within a time period enabled for the ST by said central terminal, the central terminal comprising:
    a measurement unit, operative for each of a given series of time periods, to measure an optical reception level of an optical fiber signal in the time period;
    a table that at least stores said reception level of a received signal from each of said STs in association with the ST, said reception level being measured by said measurement unit in a normal state where signals from said STs are exclusively received;
    a decision unit, operative for each of said given series of time periods, for deciding whether a signal from one of said STs associated with the time period is exclusively received with no collision with any other signal; and
    an identification unit, responsive to a decision that said signal from an ST associated with the time period is not exclusively received, to identify a defective one of said STs which causes signals from said STs to be received colliding with each other in the central terminal, based on a value obtained by subtracting said stored reception level from said measured optical reception level for the time period.

12. A method used in a point-to-multipoint network comprising a central terminal and a plurality of subscriber terminals (STs) wherein each of said STs is enabled to send a signal only within a time period enabled for the ST by said central terminal, the method comprising:
- measuring an optical reception level of an optical fiber signal in the time period, for each of a given series of time periods;
- storing, in advance, in a table at least said reception level of a received signal from each of said STs in association with the ST, said reception level being measured in a normal state where signals from said STs are exclusively received;
- deciding whether a signal from one of said STs associated with the time period is exclusively received with no collision with any other signal, for each of said given series of time periods; and
- identifying a defective one of said STs which causes signals from said STs to be received colliding with each other in the central terminal, based on a value obtained by subtracting said stored reception level from said measured optical reception level for the time period, when said signal from an ST associated with the time period is not exclusively received.

13. A program storage medium readable by a device which is provided in a central terminal (CT) and which is connected with one end of an optical fiber branched and connected to a plurality of subscriber terminals (STs) in a point-to-multipoint network comprising the CT and the plurality of STs, wherein each of said STs is enabled to send a signal only within a time period enabled for the ST by said CT, said medium tangibly embodying a program of instructions executable by the device to perform a method, the method comprising:
- measuring an optical reception level of an optical fiber signal in the time period, for each of a given series of time periods;
- storing, in advance, in a table at least said reception level of a received signal from each of said STs in association with the ST, said reception level being measured in a normal state where signals from said STs are exclusively received;
- deciding whether a signal from one of said STs associated with the time period is exclusively received with no collision with any other signal, for each of said given series of time periods; and
- identifying a defective one of said STs which causes signals from said STs to be received colliding with each other in said CT, based on a value obtained by subtracting said stored reception level from said measured optical reception level for the time period, when said signal from an ST associated with the time period is not exclusively received.

* * * * *